(12) United States Patent
Na

(10) Patent No.: US 11,734,178 B2
(45) Date of Patent: Aug. 22, 2023

(54) STORAGE DEVICE PERFORMING CACHE READ OPERATION USING PAGE BUFFER AND OPERATING METHOD THEREOF

(71) Applicant: SK hynix Inc., Gyeonggi-do (KR)

(72) Inventor: Chung Un Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 134 days.

(21) Appl. No.: 17/358,922

(22) Filed: Jun. 25, 2021

(65) Prior Publication Data

US 2022/0188234 A1   Jun. 16, 2022

(30) Foreign Application Priority Data

Dec. 10, 2020   (KR) .................. 10-2020-0172469

(51) Int. Cl.
*G06F 12/08* (2016.01)
*G06F 12/0844* (2016.01)
*G06F 12/02* (2006.01)

(52) U.S. Cl.
CPC ...... *G06F 12/0844* (2013.01); *G06F 12/0253* (2013.01); *G06F 2212/608* (2013.01); *G06F 2212/7205* (2013.01)

(58) Field of Classification Search
CPC ............. G06F 12/0844; G06F 12/0253; G06F 12/0246; G06F 12/0811; G06F 12/0868; G06F 2212/608; G06F 2212/7205; G06F 2212/1016; G06F 2212/1024; G06F 2212/1032; G06F 2212/214; G06F 2212/7203; G06F 2212/7208; G06F 3/061; G06F 3/0656

See application file for complete search history.

(56) References Cited

U.S. PATENT DOCUMENTS

| | | | |
|---|---|---|---|
| 7,562,180 B2* | 7/2009 | Gyl | G11C 7/22 365/185.01 |
| 2011/0022781 A1* | 1/2011 | Wakrat | G06F 12/0246 711/E12.001 |
| 2016/0070471 A1* | 3/2016 | Kojima | G06F 3/0656 711/103 |
| 2017/0228167 A1* | 8/2017 | Manohar | G06F 3/061 |

(Continued)

FOREIGN PATENT DOCUMENTS

| | | |
|---|---|---|
| KR | 10-2016-0078611 A | 7/2016 |
| KR | 10-2020-0055349 A | 5/2020 |

*Primary Examiner* — Tracy C Chan
(74) *Attorney, Agent, or Firm* — IP & T Group LLP

(57) ABSTRACT

A storage device includes: a memory device including a plurality of planes, and a plurality of cache buffers and data buffers; and a memory controller for controlling the memory device to transmit first data and second data from first plane and second plane into the respective first cache buffer and second cache buffer, and control the first cache buffer and the second cache buffer to transmit the first data and the second data to the memory controller. In response to a read request for third data from a host while the first data is transmitting from the first cache buffer to the memory controller, the memory controller transmits a cache read command to the memory device such that the memory device reads the third data after the first data is completely transmitted to the memory controller, before the second data is transmitted from the second cache buffer.

18 Claims, 12 Drawing Sheets

(56) References Cited

U.S. PATENT DOCUMENTS

2018/0018269 A1* 1/2018 Jannyavula Venkata ..................... G06F 12/0868
2019/0087101 A1* 3/2019 Endo ..................... G06F 3/0611
2019/0227715 A1* 7/2019 Hong ..................... G06F 3/0679

* cited by examiner

STORAGE DEVICE PERFORMING CACHE READ OPERATION USING PAGE BUFFER AND OPERATING METHOD THEREOF

CROSS-REFERENCE TO RELATED APPLICATION

The present application claims priority under 35 U.S.C. § 119(a) to Korean patent application number 10-2020-0172469 filed on Dec. 10, 2020, which is incorporated herein by reference in its entirety.

BACKGROUND

Field of Invention

The present disclosure generally relates to an electronic device, and more particularly, to a storage device and an operating method thereof.

Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Various embodiments of the present disclosure provide a storage device for performing an improved read operation and an operating method of the storage device.

In accordance with an aspect of the present disclosure, there is provided a storage device including: a memory device including a plurality of planes including a plurality of memory blocks storing data, and a plurality of pairs of cache buffers and data buffers, the plurality of pairs respectively coupled to the plurality of planes; and a memory controller configured to control the memory device to transmit first data and second data from first plane and second plane into the respective first cache buffer and second cache buffer, and configured to control the first cache buffer and the second cache buffer to transmit the first data to the memory controller when the first data and the second data are stored in the first cache buffer and the second cache buffer, wherein, in response to a read request for third data from a host while the first data is transmitting from the first cache buffer to the memory controller, the memory controller is further configured to transmit a cache read command to the memory device such that the memory device reads the third data corresponding to the read request after the first data is completely transmitted from the first cache buffer to the memory controller, and before the second data is transmitted from the second cache buffer to the memory controller.

In accordance with another aspect of the present disclosure, there is provided a storage device including: a memory device including a plurality of planes and a plurality of page buffers respectively corresponding to the plurality of planes; and a memory controller configured to control the memory device to perform a garbage collection operation of moving valid data included in each of the plurality of planes and a read operation of reading host data corresponding to a read request received from a host, wherein, when the memory controller receives a read request for at least one plane from the host while the garbage collection operation is being performed on the plurality of planes, the memory controller is further configured to control the memory device to perform a cache read operation on the at least one plane in response to the read request for the at least one plane.

In accordance with the another aspect of the present disclosure, there is provided a storage system including: a memory device including plural planes respectively corresponding to plural circuits each having a first buffer and a second buffer; and a controller configured to control the memory device to: perform a garbage collection (GC) operation of moving GC data stored in the planes through the second buffers of the circuits, read, with the GC data buffered in the second buffers of the circuits, data from a selected one of the planes into the first buffer of the circuit corresponding to the selected plane according to a cache read scheme, and provide, according to the cache read scheme, the read data from the first buffer to the controller through the second buffer of the corresponding circuit as soon as the GC data is cleared from the second buffer of the corresponding circuit.

BRIEF DESCRIPTION OF THE DRAWINGS

Embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

The present disclosure may apply various changes and different shapes, therefore only illustrates in detail with particular examples. However, the examples are not limited to certain shapes but apply to all changes, equivalent materials and replacements. The drawings included are illustrated a fashion where the figures are expanded for the better understanding. In describing the embodiments, description of technologies that are known in the art and are not directly related to the present disclosure are omitted. This is to further clarify the gist of the present disclosure without clutter.

Hereinafter, various embodiments of the present disclosure will be described in detail with reference to the accompanying drawings in order for those skilled in the art to be able to readily implement the technical spirit of the present disclosure.

Figure 1:
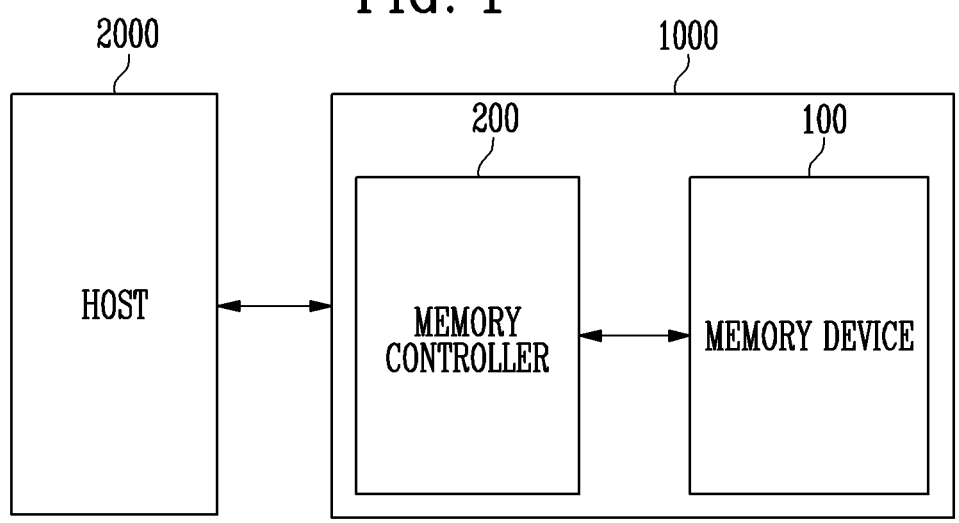
FIG. 1 is a block diagram illustrating a storage device in accordance with an embodiment of the present disclosure.

FIG. 1 is a block diagram illustrating a storage device in accordance with an embodiment of the present disclosure.

Referring to FIG. 1, the storage device 1000 may include a memory device 100 and a memory controller 200.

The storage device 1000 may be a device for storing data under the control of a host 2000, such as a mobile phone, a smart phone, an MP3 player, a laptop computer, a desktop computer, a game console, a display device, a tablet PC or an in-vehicle infotainment.

The storage device 1000 may be manufactured as any of various types of storage devices according to a host interface that is a communication scheme with the host 2000. For example, the storage device 1000 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any of various types of package types. For example, the storage device 1000 may be implemented as any of various types of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 may receive a command and an address from the memory controller 200. The memory device 100 may access an area selected by the received address in the memory cell array. When the memory device 100 accesses the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the storage device 1000. Specifically, when power is applied to the storage device 1000, the memory controller 200 may execute instructions, e.g., firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells included in the memory device 100 in which data is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim.

In accordance with an embodiment of the present disclosure, the memory controller 200 may control the memory device 100 to perform a garbage collection operation regardless of any request from the host 2000. The garbage collection operation may be an operation of collecting only valid data among data stored in a victim block, moving the collected valid data to another free block, and erasing invalid data to secure a free block. For example, the garbage collection operation may be configured with a garbage read operation of collecting valid data stored in a victim block included in the memory device 100, a garbage program operation of programming the collected valid data in a target block, and a garbage erase operation of erasing the victim block.

Also, in accordance with an embodiment of the present disclosure, when the memory controller 200 receives a read request from the host 2000 during a garbage collection regardless of any request from the host 2000, the memory controller 200 may control the memory device 100 to preferentially process a read operation corresponding to the received read request. Also, the memory controller 200 may control the memory device 100 to perform a cache read operation in response to the read request received during the garbage collection operation.

The host 2000 may communicate with the storage device 1000, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
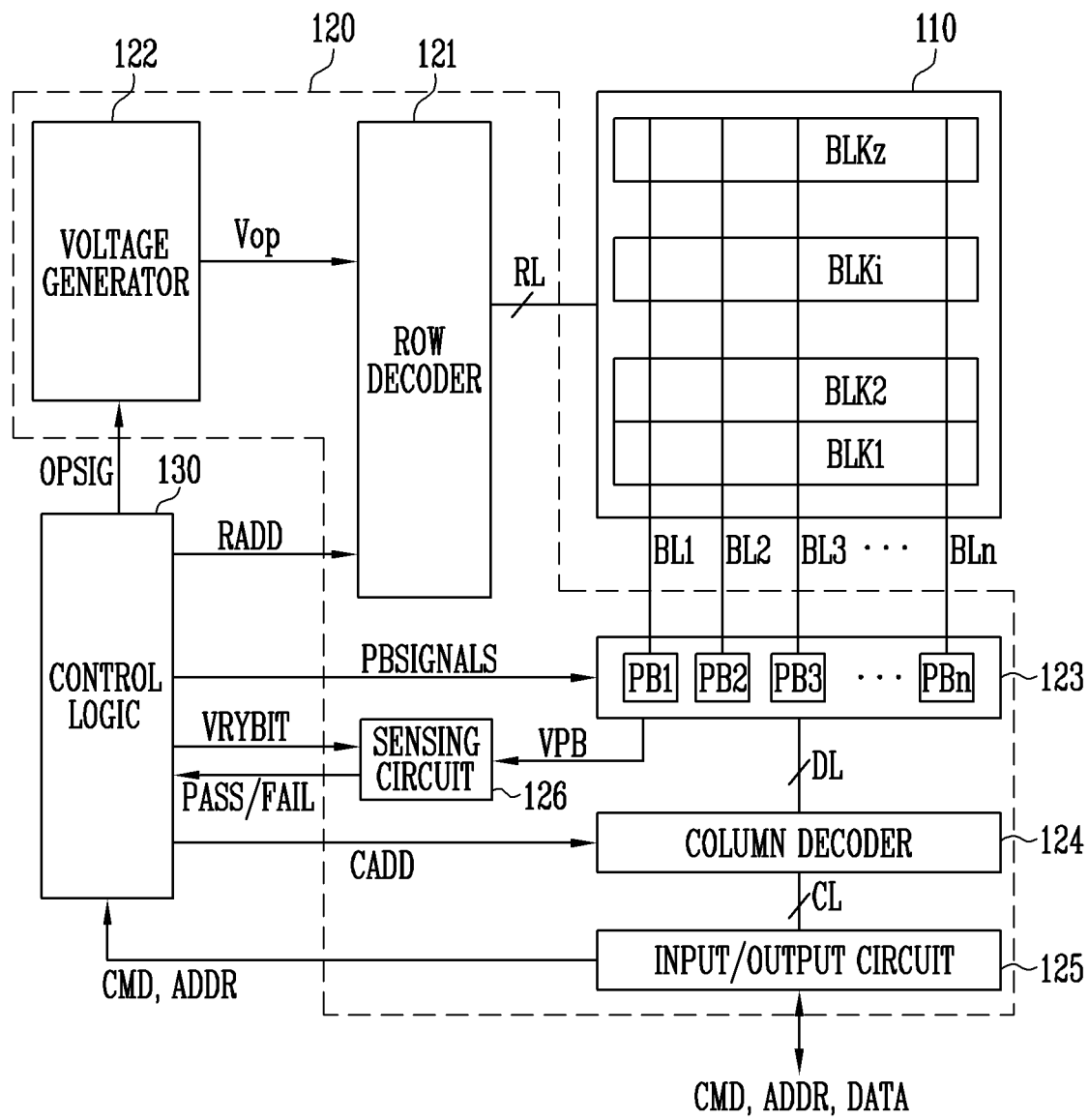
FIG. 2 is a block diagram illustrating a memory device in accordance with an embodiment of the present disclosure.

FIG. 2 is a block diagram illustrating a memory device in accordance with an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may correspond to one page. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may be configured to perform a program operation, a read operation or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130. Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according to the decoded address.

For example, in a program operation, the row decoder 121 may apply a program voltage to the selected word line, and apply a program pass voltage having a level different from (e.g., lower than) that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a reference (e.g., ground) voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and output the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR.

Also, the control logic 130 may determine whether the verify operation has passed or failed in response to the pass or fail signal PASS or FAIL. Also, the control logic 130 may control the page buffer group 123 to temporarily store verify information including the pass or fail signal PASS or FAIL in the page buffer group 123. Specifically, the control logic 130 may determine a program state of a memory cell in response to the pass or fail signal PASS or FAIL. For example, when the memory cell operates as a Triple Level Cell (TLC), the control logic 130 may determine whether the program state of the memory cell is one of an erase state E or first to seventh program states P1 to P7.

Figure 3:
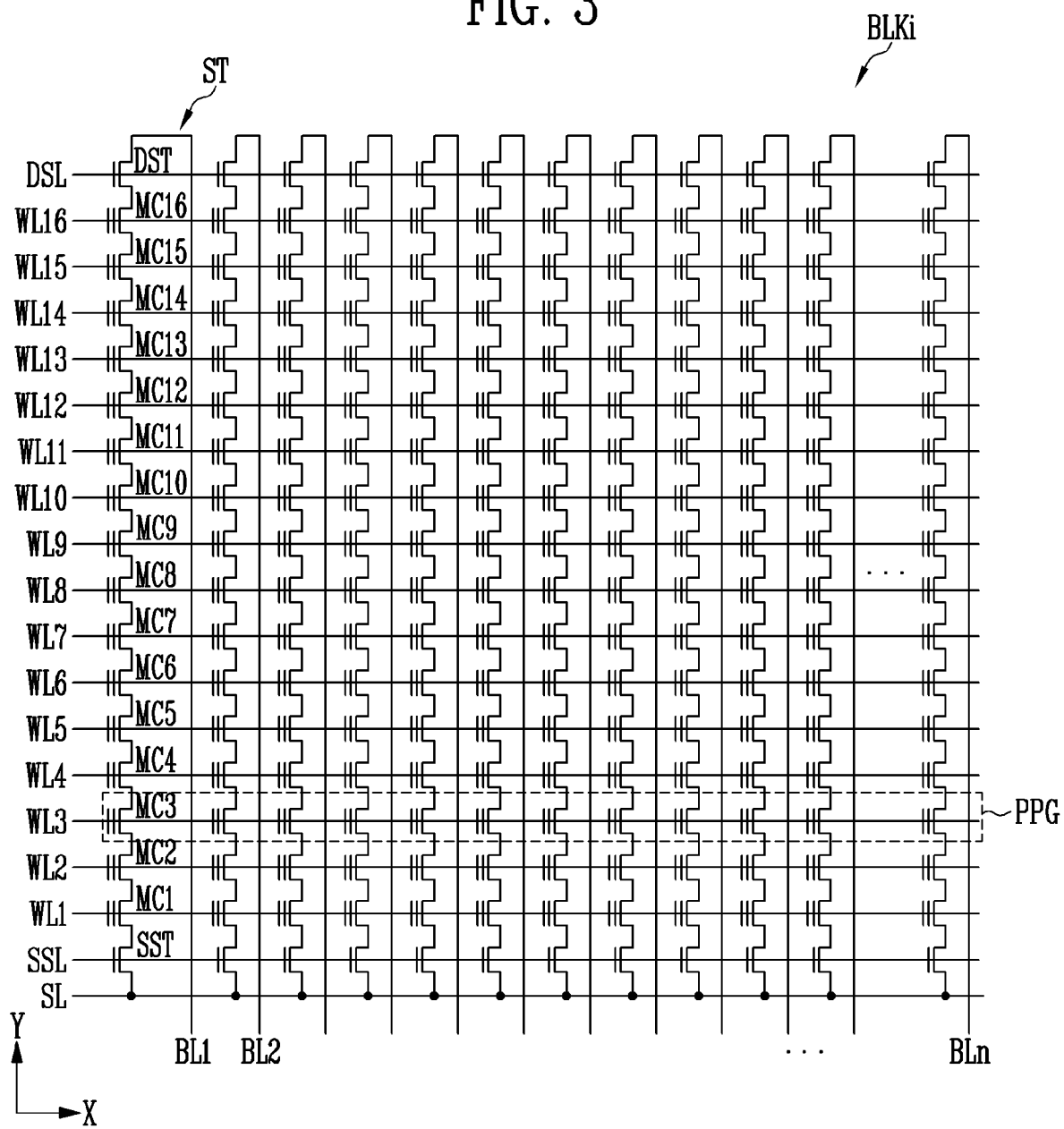
FIG. 3 is a diagram illustrating a memory block in accordance with an embodiment of the present disclosure.

FIG. 3 is a diagram illustrating a memory block in accordance with an embodiment of the present disclosure.

Referring to FIG. 3, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one source select transistor SST and at least one drain select transistor DST may be included in one string ST, and a number of memory cells which is greater than that of the memory cells MC1 to MC16 shown in the drawing may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PPG. Therefore, physical pages PPG corresponding to the number of the word lines WL1 to WL16 may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The SLC may store one-bit data. One physical page PG of the SLC may store one logical page (LPG) data. The one LPG data may include a number of data bits which correspond to the number of cells included in the one physical page PPG.

The MLC, the TLC, and the QLC may store two or more-bit data. One physical page PPG may store two or more LPG data.

In a nonvolatile memory device, data stored in a memory cell cannot be overwritten and updated. Therefore, whenever data stored in the memory device 100 is updated or modified, data which previously existed may become old data or invalid data, and data stored in a new open block may become new data or valid data. Alternatively, when an error occurs due to an unknown reason while an internal operation such as a program operation, a read operation, or an erase operation is being performed, data stored in a corresponding area is not reliable, and therefore, a garbage collection operation may be performed as a method for managing a bad block in which an error occurs. Hereinafter, the garbage collection operation will be described with reference to FIG. 4.

Figure 4:
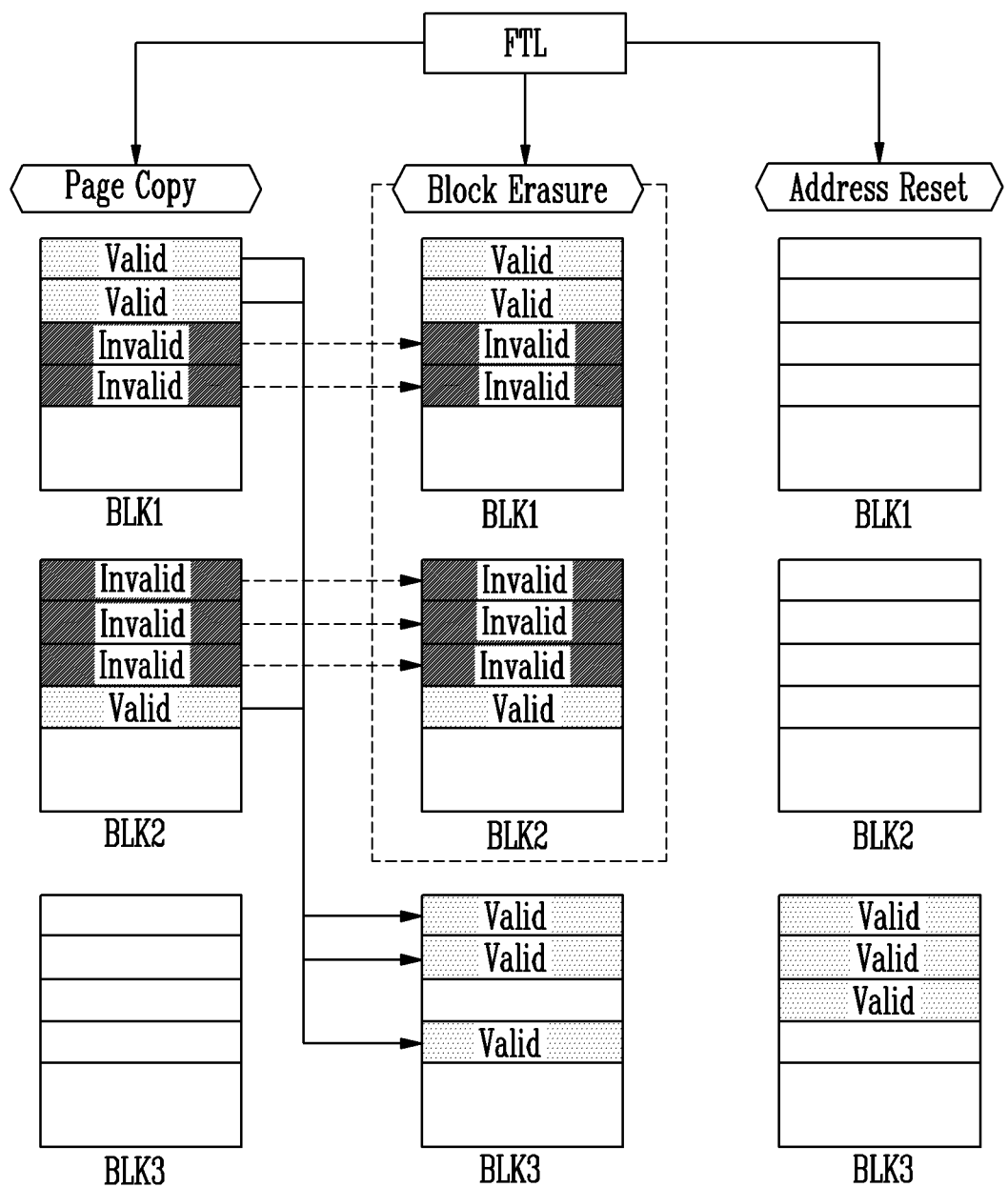
FIG. 4 is a diagram illustrating a garbage collection operation in accordance with an embodiment of the present disclosure.

FIG. 4 is a diagram illustrating a garbage collection operation in accordance with an embodiment of the present disclosure.

Referring to FIG. 4, a diagram is illustrated, in which a garbage collection operation is performed in the storage device 1000. The garbage collection operation may be an operation of collecting only valid data among data stored in a victim block, moving the collected valid data to another free block, and erasing invalid data to secure a free block. For example, the garbage collection operation may be configured with a garbage read operation of collecting valid data stored in a victim block included in the memory device 100, a garbage program operation of programming the collected valid data in a target block, and a garbage erase operation of erasing the victim block. The invalid data may mean data not to be used due to update or movement of the data, and the valid data may be newest data or normal data, which can be used.

The storage device 1000 may detect a page state (e.g., a valid page state, an invalid page state, or the like) for each of a plurality of pages PG included in each of a plurality of memory blocks BLK in the memory device 100 with reference to a valid page table VPT. The valid page table VPT may include page state information of each of a plurality of pages PG (information for checking whether the page is a valid page) such that the memory controller 200 can detect a page state (e.g., a valid page state, an invalid page state, or the like) for each of the plurality of pages PG.

Also, the memory controller 200 may move a plurality of detected valid pages to an open block. For example, each of a first memory block BLK1 and a second memory block BLK2 may include at least one valid page. In addition, a third memory block BLK3 may be an open block or a target block, to which the valid page is to be moved. Specifically, the memory controller 200 may control the memory device 100 to move the valid pages stored in the first memory block BLK1 and the second memory block BLK2 to the third memory block BLK3.

Also, the memory controller 200 may erase the first memory block BLK1 and the second memory block BLK2. The memory controller 200 may secure two free blocks by erasing the first memory block BLK1 and the second memory block BLK2, and secure a data storage space by erasing invalid data. Also, the memory controller 200 may organize the valid and invalid pages by performing address resetting.

The memory controller 200 moves the valid pages distributed and stored in the first memory block BLK1 and the second memory block BLK2 to the third memory block BLK3. Thus, free blocks can be secured, and a storage space corresponding to that of an area in which the invalid pages are stored.

Figure 5:
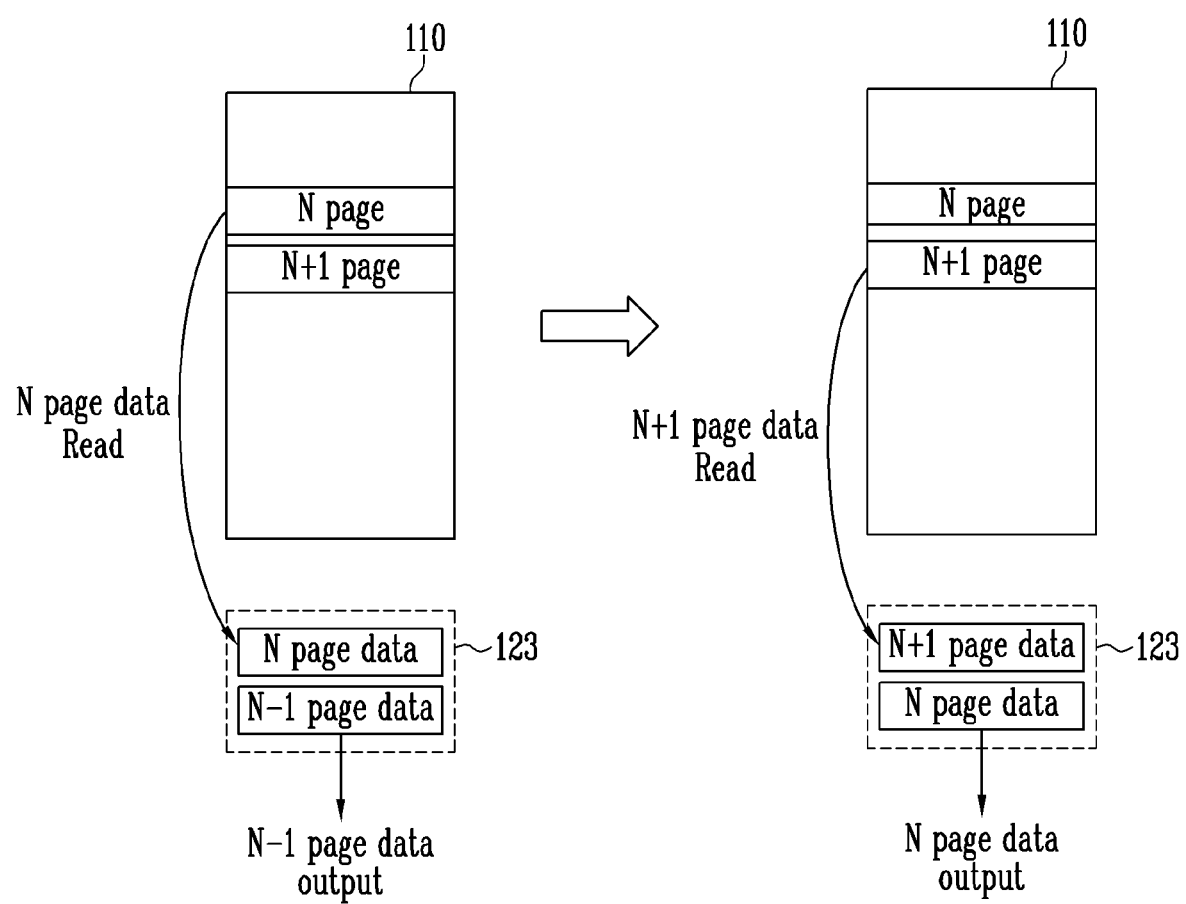
FIG. 5 is a diagram illustrating a cache read operation in accordance with an embodiment of the present disclosure.

FIG. 5 is a diagram illustrating a cache read operation in accordance with an embodiment of the present disclosure.

Referring to FIG. 5, a plurality of pages included in the memory cell array 100 may be sequentially read to the page buffer group 123. Specifically, the memory device 100 reads data stored in the memory cell array 110 under the control of the memory controller 200. Memory cells connected to the same word line may correspond to one page, and the memory device 100 may read stored data in one page unit. For example, the memory device 100 may read an Nth page, and read an (N+1)th page.

The memory device 100 may perform a cache read operation of reading next page data while outputting specific page data by using the page buffer group 123. Specifically, the memory device 100 may read Nth page data stored in the Nth page to the page buffer group 123 while outputting (N−1)th page data temporarily stored in the page buffer group 123. Then, when the (N−1)th page data are all output, the memory device 100 may output the Nth page data temporarily stored in the page buffer group 123. The memory device 100 may read (N+1)th page data stored in the (N+1)th page to the page buffer group 123 while outputting the Nth page data temporarily stored in the page buffer group 123.

That is, while specific page data are output, next page data are input (or read) to the page buffer group 123, and thus the memory device 100 can decrease a read time to read data stored in all the pages.

Figure 6:
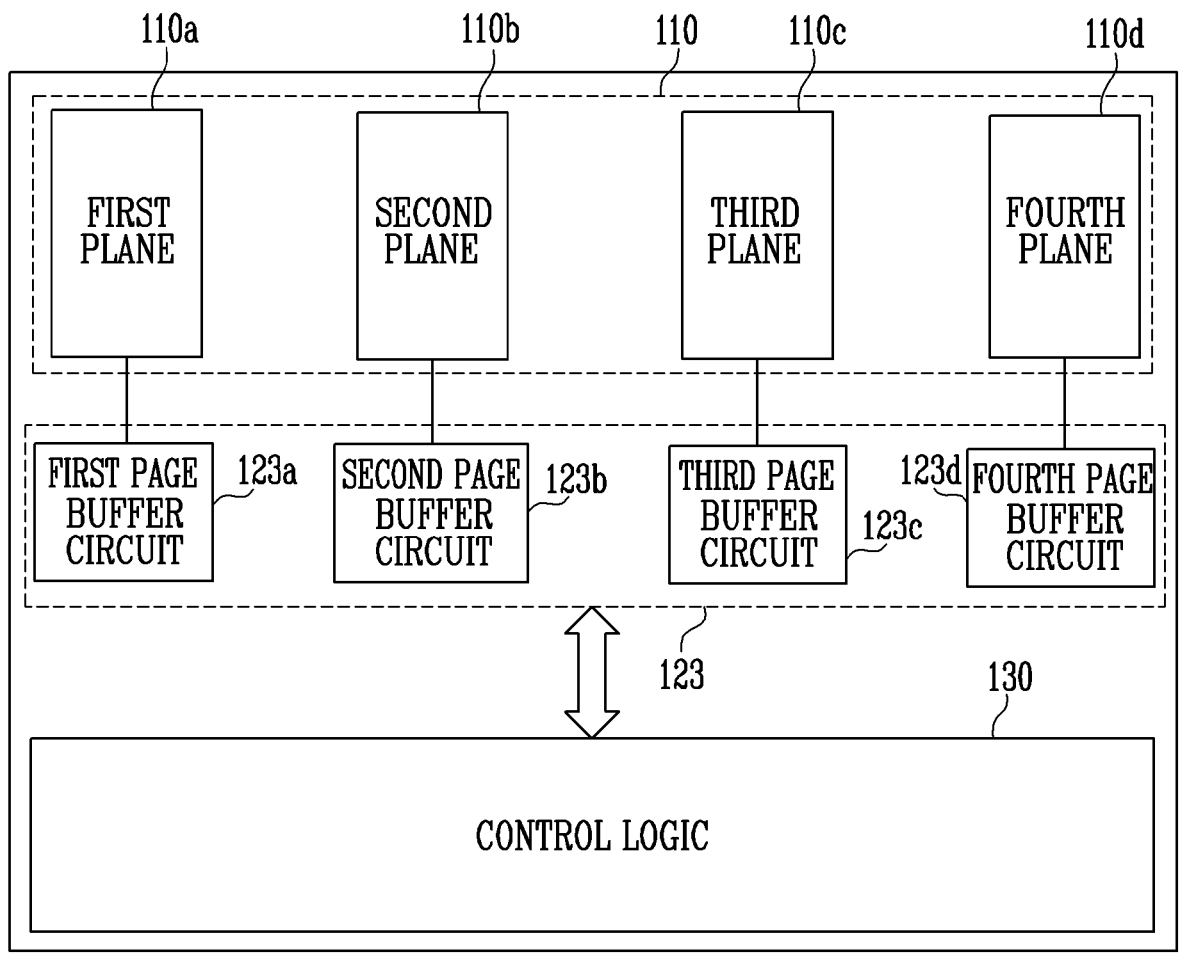
FIG. 6 is a diagram illustrating a memory device including a plurality of planes and a plurality of page buffers in accordance with an embodiment of the present disclosure.

FIG. 6 is a diagram illustrating a memory device including a plurality of planes and a plurality of page buffers in accordance with an embodiment of the present disclosure.

Referring to FIG. 6, the memory device 100 is illustrated, which includes a memory cell array 110, a page buffer group 123, and a control logic 130.

The memory cell array 110 and the page buffer group 123 may be divided into a plurality of planes and a plurality of page buffer circuits (which also may be referred to as page buffers), which are connected to each other through bit lines BL. That is, each of the plurality of planes and each of the plurality of page buffer circuits may form a pair to operate as one plane unit. For example, a first plane 110a and a first page buffer circuit 123a may form a pair to operate as a plane unit, a second plane 110b and a second page buffer circuit 123b may form a pair to operate as a plane unit, a third plane 110c and a third page buffer circuit 123c may form a pair to operate as a plane unit, and a fourth plane 110d and a fourth page buffer circuit 123d may form a pair to operate as a plane unit. The plurality of planes and the plurality of page buffer circuits, which are included in the memory device 100, may be divided into a plurality of corresponding pairs, and each of the pairs may independently operate as one plane unit.

The control logic 130 may control a peripheral circuit including the page buffer group 123 to independently perform a read operation on memory cells included in each of the plurality of planes. For example, the control logic 130 may control the peripheral circuit to perform a read operation on each of the first to fourth planes 110a to 110d.

Also, the control logic 130 may control the peripheral circuit to independently perform a read operation for each plane. Data read from each plane are temporarily stored in a page buffer circuit corresponding thereto, and therefore, read operations may be independently performed for each plane.

Figure 7:
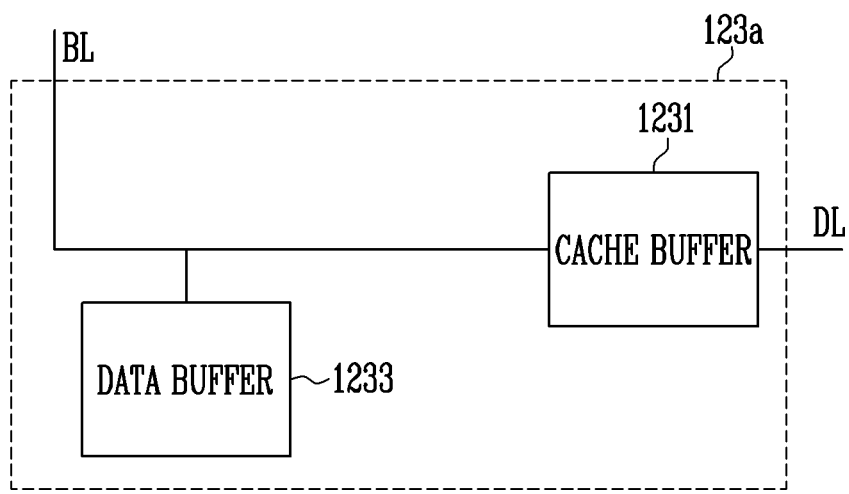
FIG. 7 is a diagram illustrating a cache buffer and a data buffer in accordance with an embodiment of the present disclosure.

FIG. 7 is a diagram illustrating a cache buffer and a data buffer in accordance with an embodiment of the present disclosure.

Referring to FIG. 7, the first page buffer circuit 123a among the plurality of page buffer circuits included in the page buffer group 123 is illustrated. Although only the first page buffer circuit 123a is illustrated in FIG. 7, the second to fourth page buffer circuits 123b to 123d shown in FIG. 6 may be formed in the same structure as the first page buffer circuit 123a shown in FIG. 7. The first page buffer circuit 123a may include a cache buffer 1231 and a data buffer 1233.

The first page buffer circuit 123a may be connected to the memory cell array 110 through a bit line BL. The first page buffer circuit 123a may operate under the control of the control logic 130 in a read operation. Specifically, the first page buffer circuit 123a may operate in response to the page buffer control signals PBSIGNALS. The first page buffer circuit 123a may exchange data with the column decoder 124 through data lines DL.

In an embodiment of the present disclosure, the cache buffer 1231 and the data buffer 1233, which are included in the first page buffer circuit 123a, may temporarily store data stored in a memory cell connected to the bit line BL.

The cache buffer 1231 may temporarily store valid data or host data, and output the temporarily stored valid data or the temporarily stored host data to a data line. Specifically, the cache buffer 1231 may be connected to a data line DL, and output data to the outside. In accordance with an embodiment of the present disclosure, the valid data or the host data, which is temporarily stored in the cache buffer 1231, may be output to the data line DL, and the output data may be transmitted to the memory controller 200 through the input/output circuit 125.

The data buffer 1233 may temporarily store subsequent data while data is output through the cache buffer 1231. Specifically, one end of the data buffer 1233 may be connected to the bit line BL, and the other end of the data buffer 1233 may be connected to the cache buffer 1231. The data buffer 1233 may sense data stored in the memory cell array 110 through the bit line BL, and temporarily store the sensed data. The data buffer 1233 may temporarily store subsequent data while the valid data or the host data is output. Since the data buffer 1233 is not directly connected to the data line DL, data stored in the data buffer 1233 may be moved to the cache buffer 1231 and then output.

The memory device 100 may perform the cache read operation described with reference to FIG. 5 by using the page buffer group 123. Specifically, the memory device 100 may perform the cache read operation by using the cache buffer 1231 and the data buffer 1233, which are included in the first page buffer group 123a. For example, the memory device 100 may perform the cache read operation of reading subsequent data to the data buffer 1233, while valid data is output to the data line DL from the cache buffer 1231.

In accordance with the embodiment of the present disclosure, while valid data is transmitted to the memory controller 200 through the data line DL, host data corresponding to a host request is read to the data buffer 1233 and is preferentially output, so that the memory device 100 can decrease a read time according to a read request of the host 2000.

Figure 8:
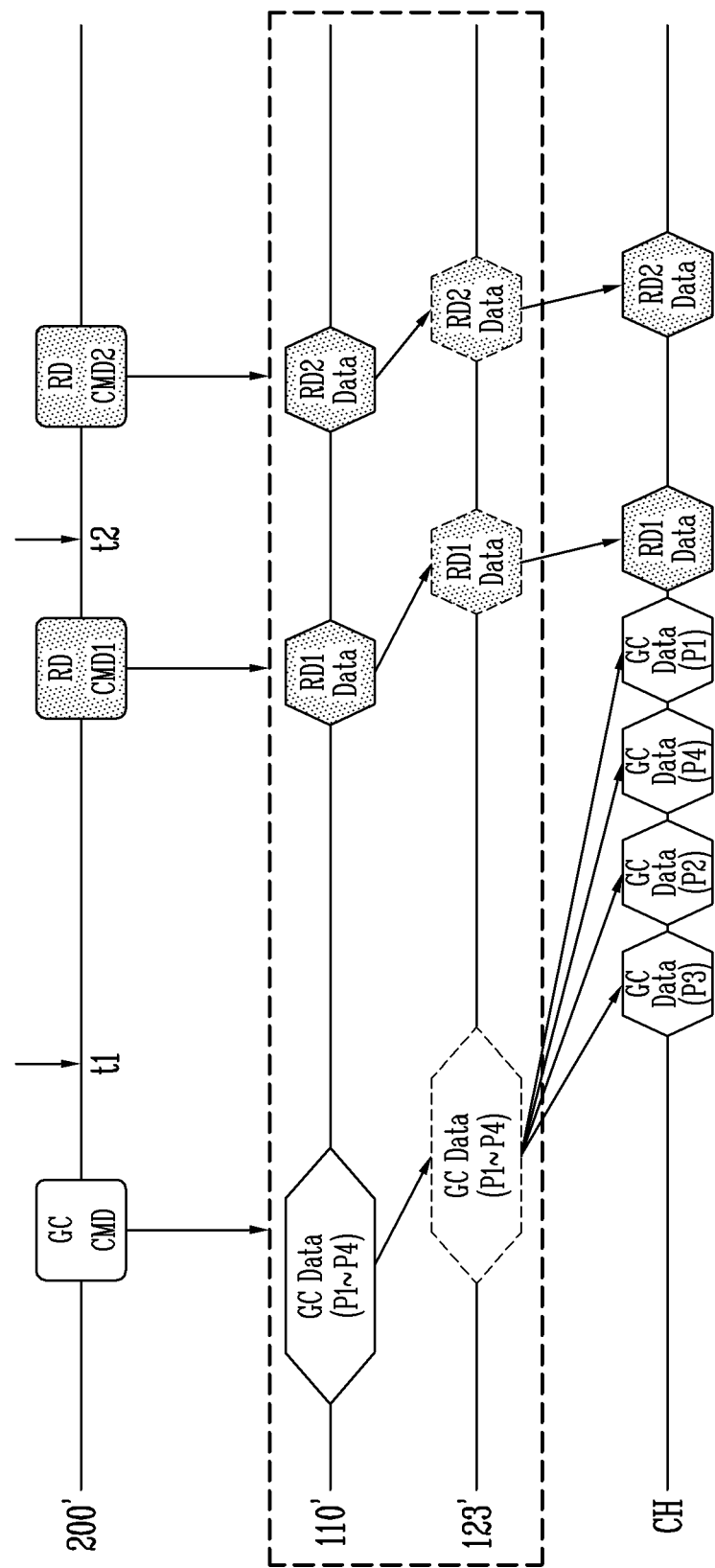
FIG. 8 is a diagram illustrating a method for processing a read request received during a garbage collection operation, in accordance with some methods which have been proposed.

FIG. 8 is a diagram illustrating a conventional method for processing a read request received during a garbage collection operation.

Referring to FIG. 8, in some methods which have been proposed, the storage device processes the read request when the storage device receives a read request from a host while performing a garbage collection operation.

In accordance with the embodiment shown in FIG. 8, a memory controller 200' may transmit a command GC CMD such that a memory device 100' performs a garbage collection operation, regardless of any request form the host. Specifically, the memory controller 200' may transmit the command GC CMD to collect valid data GC Data in a memory cell array 110' divided into a plurality of planes (e.g., first to fourth planes P1 to P4).

In accordance with the embodiment shown in FIG. 8, the memory device 100' may read valid data from a victim block included in each of the plurality of planes in response to the command GC CMD received from the memory controller 200'. Specifically, the memory device 100' may temporarily store valid data GC Data in a page buffer circuit corresponding to each of the plurality of planes in a page buffer group 123' in response to the command GC CMD received from the memory controller 200'.

Also, the memory device 100' may transmit, to the memory controller 200, valid data GC Data from each of the page buffer circuits corresponding to the plurality of planes. Specifically, each page buffer circuit may randomly output valid data under the control of the memory controller 200' or a control logic. For example, valid data may be output to a channel CH from a page buffer circuit corresponding to the third plane, valid data may be output to the channel CH from a page buffer circuit corresponding to the second plane, valid data may be output to the channel CH from a page buffer circuit corresponding to the fourth plane, and valid data may be output to the channel CH from a page buffer circuit corresponding to the first plane.

In accordance with the embodiment shown in FIG. 8, when the memory controller 200' receives a first read request from the host while valid data is transmitted to the memory controller 200' from the page buffer circuit corresponding to the third plane (e.g., a first time t1), the memory controller 200' may transmit a first read command RD CMD1 to the memory device 100' in response to the first read request of the host, after valid data stored in the plurality of planes are output to the channel CH. Specifically, the memory controller 200' may transmit the first read command RD CMD1 to the memory device 100, after an internal operation (e.g., a garbage collection operation) is ended in the page buffer group 123' of the memory device 100'.

In addition, the memory device 100' may perform a first read operation in response to the first read command RD CMD1, after the valid data are all output from the page buffer circuits corresponding to the first to fourth planes. Specifically, the memory device 100' may read data RD1 data corresponding to the first read command RD CMD1 to the page buffer group 123'. In addition, when the memory device 100' receives a second read request from the host while reading the data corresponding to the first read command RD CMD1 to the page buffer group 123' (e.g., a second time t2), the memory controller 200' may transmit a second read command RD CMD2 to the memory device 100, after the read operation corresponding to the first read command RD CMD1 is ended. When the read operation corresponding to the first read command RD CMD1 is ended, the memory device 100' may perform a read operation corresponding to the second read command RD CMD2.

That is, in accordance with the embodiment shown in FIG. 8, a read request received from the host is processed after an internal operation (e.g., a garbage collection operation) performed regardless of any request of the host is performed. Therefore, the read request received from the host may be delayed due to the internal operation.

Figure 9:
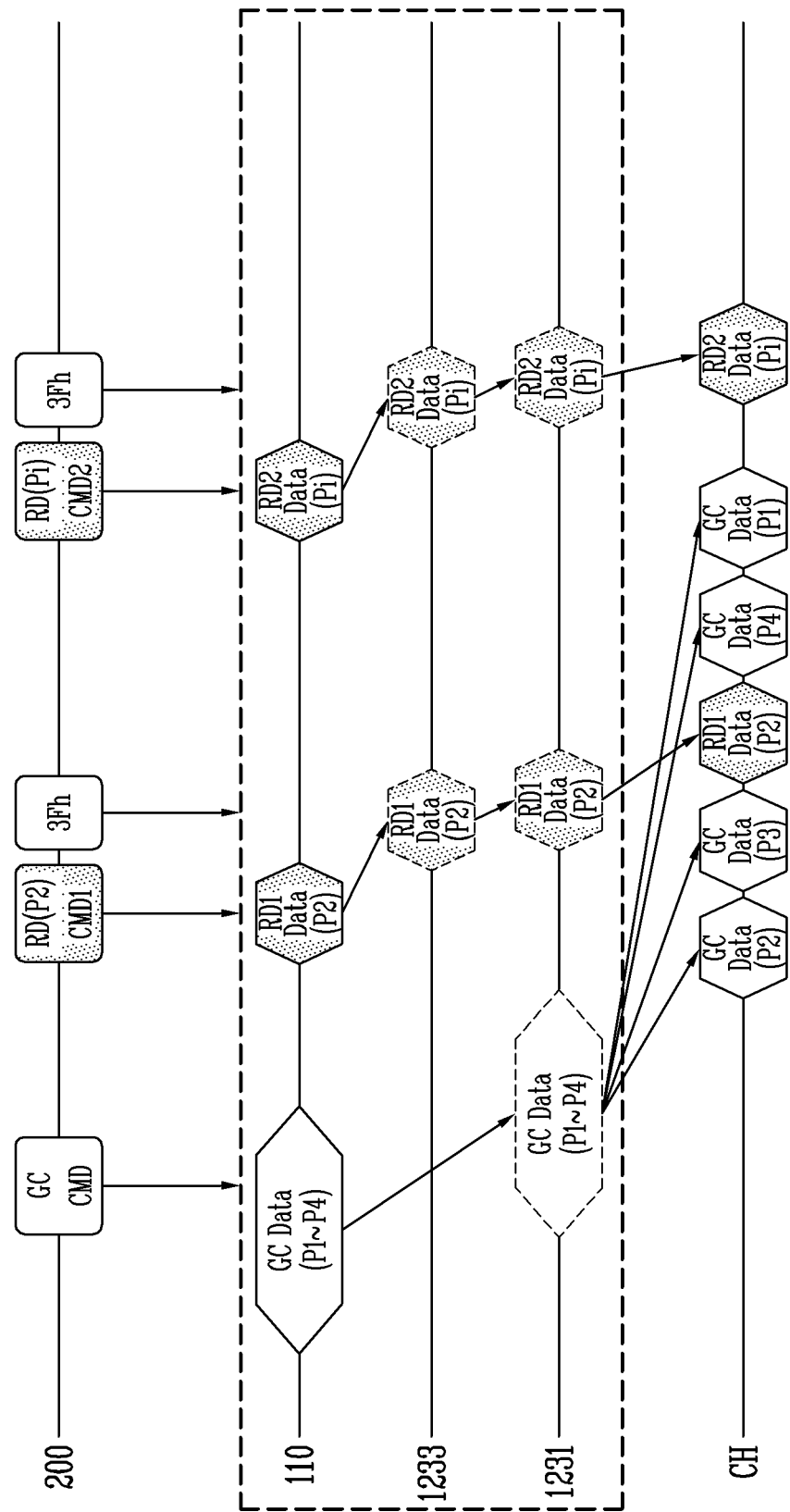
FIG. 9 is a diagram illustrating a method for processing a read request received during a garbage collection operation in accordance with an embodiment of the present disclosure.

FIG. 9 is a diagram illustrating a method for processing a read request received during a garbage collection operation in accordance with an embodiment of the present disclosure.

Referring to FIG. 9, a method is illustrated, in which the storage device 1000 processes the read request when the storage device 1000 receives a read request from the host 2000 while performing a garbage collection operation.

In accordance with an embodiment of the present disclosure, the memory controller 200 may transmit a command GC CMD such that the memory device 100 performs a garbage collection operation regardless of any request from the host. Specifically, the memory controller 200 may transmit the command GC CMD to collect valid data GC Data in the memory cell array 110 divided in a plurality of planes (e.g., first to fourth planes P1 to P4).

In accordance with an embodiment of the present disclosure, the memory device 100 may read valid data from a victim block included in each of the plurality of planes in response to the command GC CMD received from the memory controller 200. Specifically, the memory device 100 may temporarily store valid data GC Data in a cache buffer 1231 corresponding to each of the plurality of planes in the page buffer group 123 in response to the command GC CMD received from the memory controller 200.

Also, the memory device 100 may transmit, to the memory controller 200, valid data GC Data from the cache buffers 1231 corresponding to each of the plurality of planes. Specifically, each cache buffer may randomly output valid data under the control of the memory controller 200 or the control logic 130. For example, valid data may be output to the channel CH from the cache buffer 1231 corresponding to the second plane, valid data may be output to the channel CH from the cache buffer 1231 corresponding to the third plane, valid data may be output to the channel CH from the cache buffer 1231 corresponding to the fourth plane, and valid data may be finally output to the channel CH from the cache buffer 1231 corresponding to the first plane.

When the memory controller 200 receives a first read request for the second plane from the host 200 while valid data in the cache buffer 1231 corresponding to the second plane or the third plane is transmitted to the memory controller 200, the memory controller 200 may transmit a first read command RD CMD1 to the memory device 100 in response to the first read request of the host 2000. The memory controller 200 may control the memory device 100 to perform a cache read operation in response to the first read request. Specifically, the memory device 100 may read first host data RD1 Data(P2) stored in the second plane to the data buffer 1233 in response to the first read command RD CMD1. In addition, the memory controller 200 may check whether valid data GC Data(P2) has been output from the cache buffer 1231 corresponding to the second plane. When the valid data GC Data(P2) is output from the cache buffer 1231 corresponding to the second plane P2, the memory controller 200 may control the memory device 100 to move the first host data RD1 Data(P2) temporarily stored in the data buffer 1233 corresponding to the second plane P2 to the cache buffer 1231 corresponding to the second plane P2.

Specifically, the memory controller 200 may transmit, to the memory device 100, a command 3Fh for controlling the memory device 100 to move the first host data RD1 Data (P2) stored in the data buffer 1233 to the cache buffer 1231 within the page buffer circuit 123b corresponding to the second plane P2. The memory device 100 may move the first host data RD1 Data(P2) stored in the data buffer 1233 to the cache buffer 1231 within the page buffer circuit 123b corresponding to the second plane P2 in response to the command 3Fh received from the memory controller 200. The first host data RD1 Data(P2) moved to the cache buffer 1231 corresponding to the second plane P2 may be provided to the memory controller 200 through the channel CH.

In addition, the memory controller 200 may control the memory device 100 to output valid data to the channel CH from the cache buffers 1231 corresponding to other planes (e.g., the first plane and the fourth plane).

When a second read request for any plane among the plurality of planes is received from the host 2000 before valid data GC Data(P1) is output to the channel CH from the cache buffer 1231, the memory controller 200 may control the memory device 100 to perform a read operation corresponding to the second read request. Specifically, the memory controller 200 may control the memory device 100 to perform the read operation corresponding to the second read request by transmitting a second read command RD(Pi) CMD2 corresponding to the second read request to the memory device 100.

In accordance with an embodiment of the present disclosure, when the memory controller 200 receives a read request from the host 2000 while valid data is output from the cache buffers 1231 respectively corresponding to the plurality of planes, the memory controller 200 may control the memory device 100 to preferentially perform the read request received from the host 2000. For example, it may be a case where valid data is temporarily stored in each of the cache buffers 1231 respectively corresponding to the first to fourth planes, and all the valid data are not yet transmitted from the cache buffers 1231 to the memory controller 200. When the memory controller 200 receives a read request for the third plane from the host 2000, the memory controller 200 may control the memory device 100 to transmit valid data stored in the cache buffer 1231 corresponding to the third plane to the memory controller 200. The memory controller 200 may control the memory device 100 to read host data from the third plane to the data buffer 1233 corresponding to the third plane. Also, when the cache buffer 1231 corresponding to the third plane outputs the valid data to the memory controller 200 and thus is empty, the memory controller 200 may control the memory device 100 to move the host data temporarily stored in the data buffer 1233 corresponding to the third plane to the cache buffer 1231 corresponding to the third plane.

Figure 10:
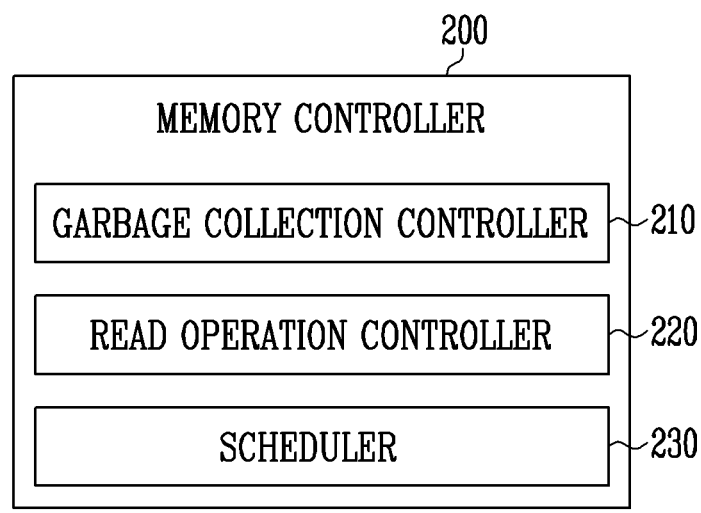
FIG. 10 is a diagram illustrating a memory controller in accordance with an embodiment of the present disclosure.

FIG. 10 is a diagram illustrating a memory controller in accordance with an embodiment of the present disclosure.

Referring to FIG. 10, the memory controller 200 may include a garbage collection controller 210, a read operation controller 220, and a scheduler 230.

The garbage collection controller 210 may control the memory device 100 to perform a garbage collection operation on each of a plurality of planes included in the memory device 100. Specifically, the garbage collection controller 210 may control the memory device 100 to autonomously perform a program operation, a read operation, or an erase operation regardless of any request from the host 2000. For example, the garbage collection operation may be configured with a garbage read operation of collecting valid data stored in a victim block included in the memory device 100, a garbage program operation of programming the collected valid data in a target block, and a garbage erase operation of erasing the victim block. In some embodiments, the garbage collection controller 210 may control the memory device 100 to collect valid data included in each of the planes in the memory device 100 with reference to a valid page table VPT.

Specifically, the garbage collection controller 210 may control the memory device 100 to temporarily store valid data included in each of the plurality of planes sequentially in page buffers and to randomly output the temporarily stored valid data to a data line. For example, the garbage collection controller 210 may transmit a garbage read operation command to first to fourth planes to perform a garbage read operation of collecting valid data respectively included in the first to fourth planes. In addition, the memory device 100 may temporarily store valid data included in each plane sequentially in page buffers corresponding to each plane under the control of the garbage collection controller 210. After the memory device 100 temporarily stores valid data corresponding to each plane in a page buffer corresponding to each plane, the memory device 100 may transmit the valid data to the memory controller 200 by using the cache buffer 1231 corresponding to each plane.

The read operation controller 220 may control the memory device 100 to perform a cache read operation. The cache read operation may be an operation of temporarily storing data in at least two buffers. Specifically, the read operation controller 220 may control the memory device 100 to sense and load subsequent data to the data buffer 1233, in a state in which the data is temporarily stored in the cache buffer 1231. Also, the read operation controller 220 may control the memory device 100 to first output the data temporarily stored in the cache buffer 1231 and to move the subsequent data temporarily stored in the data buffer 1233 to the cache buffer 1231.

For example, when the read operation controller 220 receives a read request from the host 2000 in a state in which valid data is temporarily stored in the cache buffers 1231 respectively corresponding to the plurality of planes, the read operation controller 220 may control the memory device 100 to sense host data from a selected plane in response to the read request and to load the sensed host data to the data buffer 1233 corresponding to the selected plane. Also, the read operation controller 220 may control the memory device 100 to output the valid data temporarily stored in the cache buffer 1231 corresponding to the selected plane and then move the host data temporarily stored in the data buffer 1233 to the cache buffer 1231 corresponding to the selected plane.

The scheduler 230 may determine an output sequence of data output from the page buffers. Specifically, the scheduler 230 may determine an output sequence of valid data and host data, which are output from page buffers respectively corresponding to the first to fourth planes. For example, when the scheduler 230 receives a read request for the first plane from the host 2000 in a state in which valid data included in each of the first to fourth planes is temporarily stored in the cache buffers 1231 respectively corresponding to the first to fourth planes, the scheduler 230 may determine an output sequence such that host data corresponding to the first plane is output earlier than valid data corresponding to the second to fourth planes.

Also, to preferentially process a read request received from the host 2000, the scheduler 230 may determine an output sequence such that valid data in a plane corresponding to the read request is output earlier than valid data corresponding to other planes. For example, when the scheduler 230 receives a read request for the first plane from the host 2000 in a state in which valid data included in each of the first to fourth planes is temporarily stored in the cache buffers 1231 respectively corresponding to the first to fourth planes, the scheduler 230 may determine an output sequence such that valid data corresponding to the first plane is output earlier than valid data corresponding to the second to fourth planes.

Figure 11:
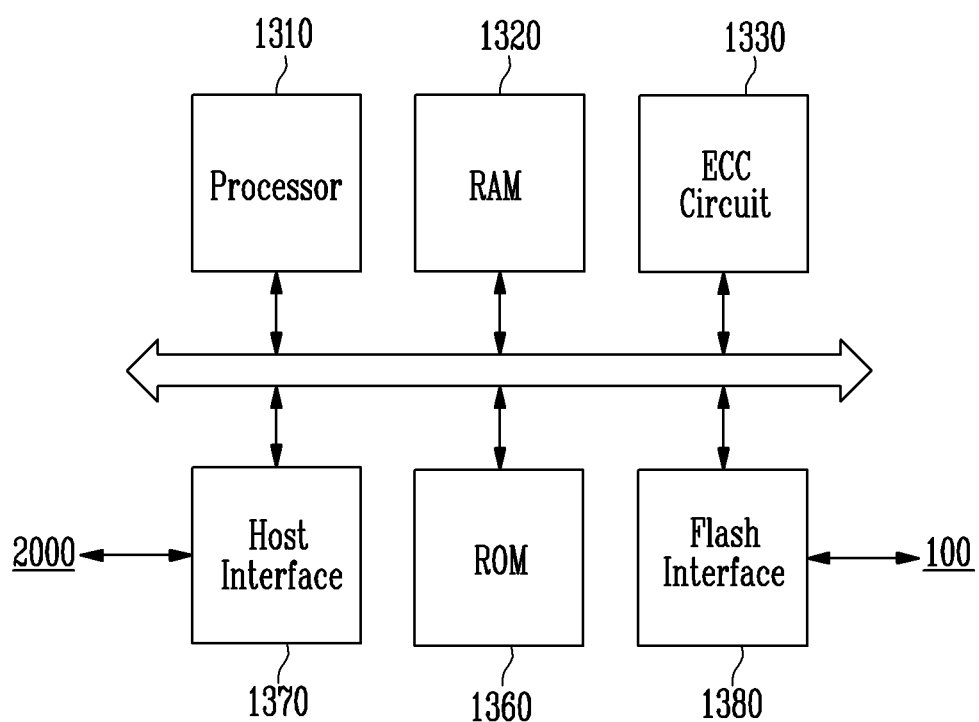
FIG. 11 is a diagram illustrating a memory controller in accordance with another embodiment of the present disclosure.

FIG. 11 is a diagram illustrating a memory controller in accordance with another embodiment of the present disclosure.

Referring to FIG. 11, the memory controller 1300 may include a processor 1310, a RAM 1320, and an ECC circuit 1330, a ROM 1360, a host interface 1370, and a flash interface 1380. The memory controller 1300 shown in FIG. 11 may be an embodiment of the memory controller 200 shown in FIG. 1 or 10.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands for a program operation, a read operation, an erase operation, a suspend operation, and a parameter setting operation.

Also, the processor 1310 may perform a function of a Flash Translation Layer (FTL). The processor 250 may translate a Logical Block Address (LBA) provided by the host 2000 into a Physical Block Address (PBA) through the FTL. The FTL may receive an LBA input, and translate the LBA into a PBA by using a mapping table. Several address mapping methods of the FTL exist according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may be implemented as a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). Also, the ECC circuit 1330 may perform ECC encoding, based on data to be written to the memory device 100. The data on which the ECC encoding is performed may be transferred to the memory device 100 through the flash interface 1380. Also, the ECC circuit 1330 may perform ECC decoding on data received from the memory device 100 through the flash interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The flash interface 1380 may communicate with the memory device 100 by using a communication protocol under the control of the processor 1310. Specifically, the flash interface 1380 may communicate a command, an address, and data with the memory device 100 through a channel. For example, the flash interface 1380 may include a NAND interface.

Figure 12:
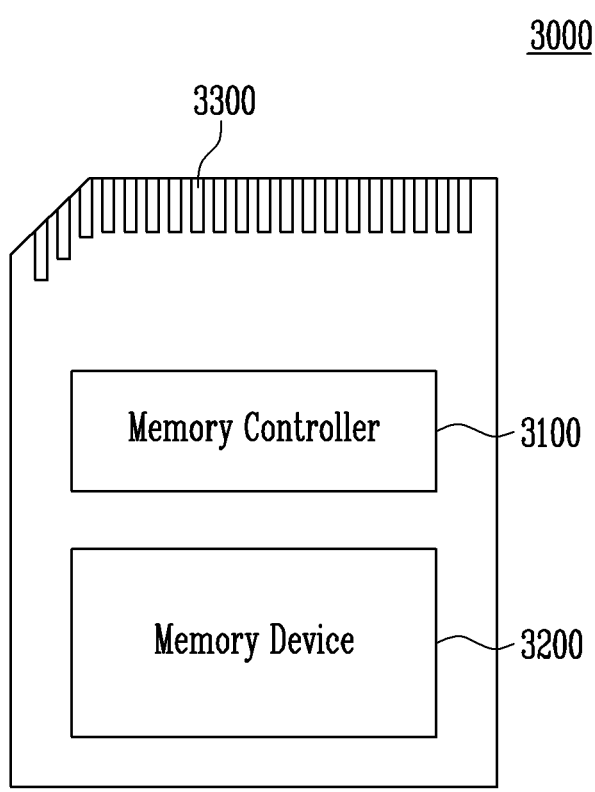
FIG. 12 is a diagram illustrating a memory card system in accordance with an embodiment of the present disclosure.

FIG. 12 is a diagram illustrating a memory card system in accordance with an embodiment of the present disclosure.

Referring to FIG. 12, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector.

The memory controller 3100 may communicate with an external device through the connector 3300. The memory controller 3100 may communicate with the external device (e.g., the host) according to a specific communication protocol. The memory controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 13:
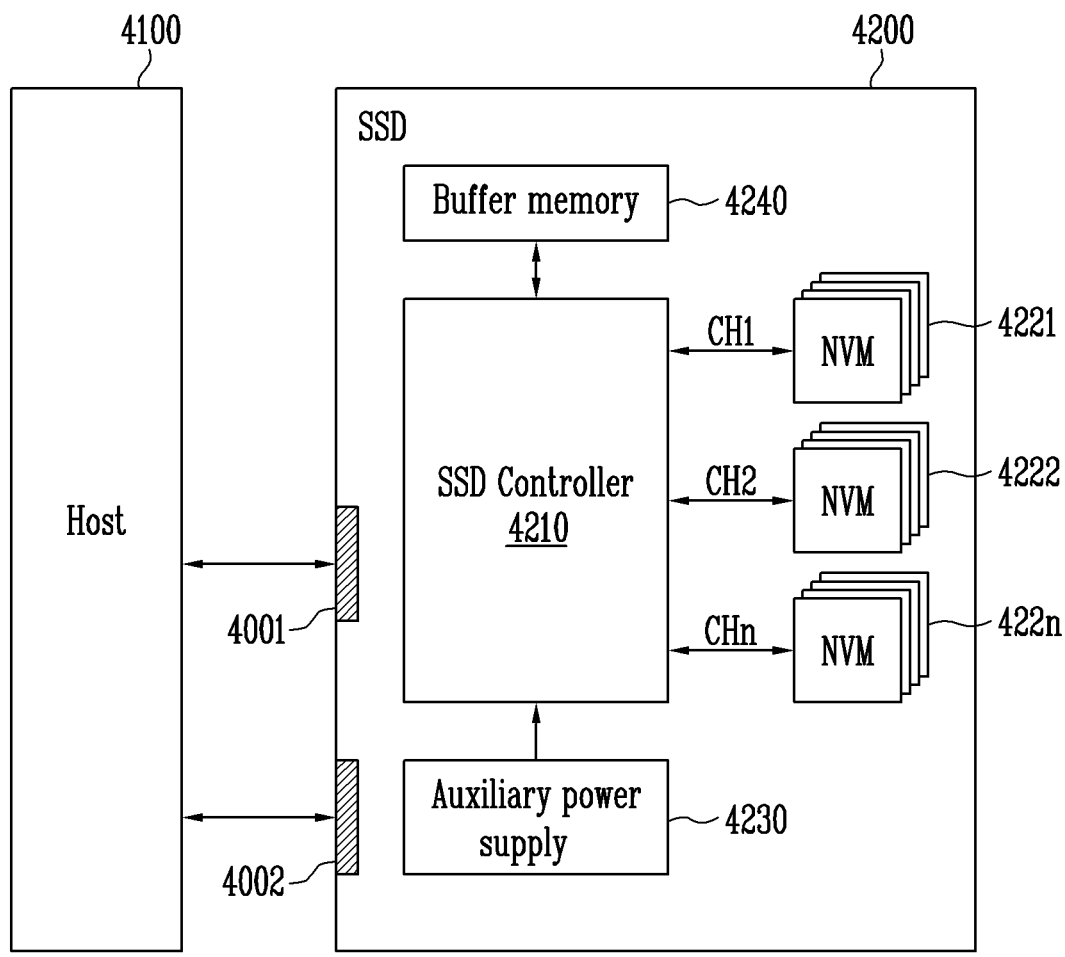
FIG. 13 is a diagram illustrating a Solid State Drive (SSD) in accordance with an embodiment of the present disclosure.

FIG. 13 is a diagram illustrating a Solid State Drive (SSD) in accordance with an embodiment of the present disclosure.

Referring to FIG. 13, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422n in response to a signal SIG received from the host 4100. The signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. The auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 14:
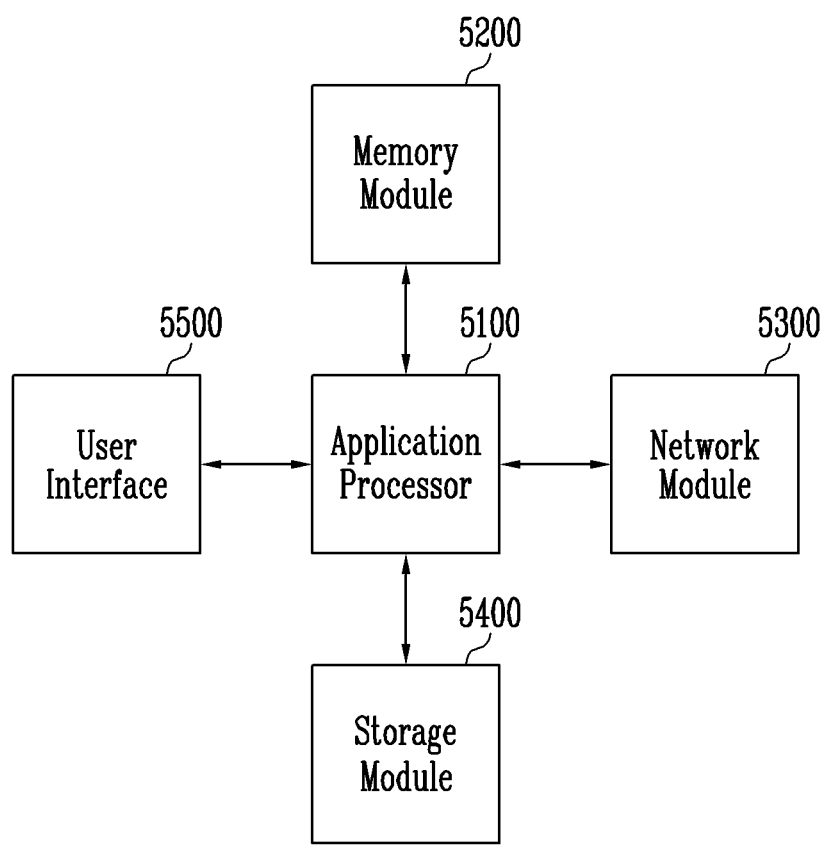
FIG. 14 is a diagram illustrating a user system in accordance with an embodiment of the present disclosure.

FIG. 14 is a diagram illustrating a user system in accordance with an embodiment of the present disclosure.

Referring to FIG. 14, the user system 5000 includes an application processor 5100, a memory module 5200, a network module 5300, a storage module 5400, and a user interface 5500.

The application processor 5100 may drive components included in the user system 5000, an operating system (OS), a user program, or the like. The application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 5100 and the memory module 5200 may be provided as one semiconductor package by being packaged based on a Package on Package (PoP).

The network module 5300 may communicate with external devices. The network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 5300 may be included in the application processor 5100.

The storage module 5400 may store data. For example, the storage module 5400 may store data received from the application processor 5100. Alternatively, the storage module 5400 may transmit data stored therein to the application processor 5100. The storage module 5400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 5400 may be provided as a removable drive such as a memory card of the user system 5000 or an external drive.

The storage module 5400 may include a plurality of nonvolatile memory devices, and the plurality of nonvolatile memory devices may operate identically to the memory device 100 described with reference to FIG. 1. 1. The storage module 5400 may operate identically to the storage device 1000 described with reference to FIG. 1.

The user interface 5500 may include interfaces for inputting data or commands to the application processor 5100 or outputting data to an external device. The user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 5500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there is provided a storage device for performing an improved read operation and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed, or some or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Further, it is noted that the present disclosure may be achieved in various ways through substitution, change, and modification that fall within the scope of the following claims, as those skilled in the art will recognize in light of the present disclosure.

What is claimed is:

1. A storage device comprising:
a memory device including a plurality of planes including a plurality of memory blocks storing data, and a plurality of pairs of cache buffers and data buffers, the plurality of pairs respectively coupled to the plurality of planes; and
a memory controller configured to control the memory device to transmit first data and second data from first plane and second plane into the respective first cache buffer and second cache buffer, and configured to control the first cache buffer and the second cache buffer to transmit the first data to the memory controller when the first data and the second data are stored in the first cache buffer and the second cache buffer,
wherein, in response to a read request for third data from a host while the first data is transmitting from the first cache buffer to the memory controller, the memory controller is further configured to transmit a cache read command to the memory device such that the memory device reads the third data corresponding to the read request after the first data is completely transmitted from the first cache buffer to the memory controller, and before the second data is transmitted from the second cache buffer to the memory controller,
wherein the memory device performs a cache read operation in response to the cache read command,
wherein the cache read operation is an operation storing data in at least two buffers including the data buffer and the cache buffer, and
wherein the cache read operation outputs from the cache buffer to a data line first page data while reading second page data to the data buffer, and afterwards the second page data stored in the data buffer is moved to the cache buffer and then output to the data line.

2. The storage device of claim 1,
wherein the cache buffers configured to store data stored in the memory device before the data is transmitted to the memory controller, and
wherein the data buffers are connected to the cache buffers, and configured to store data stored in the memory device before the stored data is transmitted to the cache buffers.

3. The storage device of claim 1, wherein, in response to the cache read command, the memory device is configured to read the third data from a third plane to a third data buffer coupled to the third plane, and simultaneously transmit data stored in a third cache buffer to the memory controller.

4. The storage device of claim 3, wherein, when the stored data in the third cache buffer is transmitted from the third cache buffer to the memory controller, the memory controller controls the memory device to transmit the third data from the third data buffer to the third cache buffer.

5. The storage device of claim 1, wherein the first data and the second data are valid data for a garbage collection operation.

6. The storage device of claim 1, wherein the memory controller includes:
   a garbage collection controller configured to control the memory device to perform a garbage collection operation of securing a free block in each of the plurality of planes;
   a read operation controller configured to control the memory device to perform the cache read operation by using the cache buffers and the data buffers; and
   a scheduler configured to determine an output sequence of the valid data and the host data, which are output from page buffers respectively including the pairs of the cache buffers and the data buffers.

7. The storage device of claim 6, wherein the garbage collection controller controls the memory device to temporarily store the valid data included in each of the plurality of planes sequentially in the page buffers, and randomly output the valid data from the page buffers to the data line.

8. The storage device of claim 6, wherein, when the scheduler receives the read request for the third data from the host while transmitting the first data to the memory controller, the scheduler determines the output sequence such that the third data is transmitted earlier than the second data.

9. The storage device of claim 8, wherein the scheduler determines the output sequence such that the valid data stored in third cache buffer is output earlier than the third data.

10. A storage device comprising:
    a memory device including a plurality of planes and a plurality of page buffers respectively corresponding to the plurality of planes; and
    a memory controller configured to control the memory device to perform a garbage collection operation of moving valid data included in each of the plurality of planes and a read operation of reading host data corresponding to a read request received from a host,
    wherein, when the memory controller receives a read request for at least one plane from the host while the garbage collection operation is being performed on the plurality of planes, the memory controller is further configured to control the memory device to perform a cache read operation on the at least one plane in response to the read request for the at least one plane,
    wherein the cache read operation is an operation storing data in at least two buffers included in each of page buffers,
    wherein each of the page buffers includes:
    a cache buffer configured to temporarily store the valid data or the host data, and output the temporarily stored valid data or the temporarily stored host data to a data line; and
    a data buffer configured to temporarily store the host data to output the host data to the cache buffer while the cache buffer outputs the valid data, and
    wherein, when the memory controller receives the read request for the at least one plane before the valid data is output from the cache buffer corresponding to the at least one plane to the data line, the memory controller controls the memory device to output the valid data from the cache buffer corresponding to the at least one plane to the data line and then output the host data corresponding to the read request for the at least one plane to the data line through the data buffer and the cache buffer.

11. The storage device of claim 10, wherein the memory controller controls the memory device to output the valid data from the cache buffer corresponding to the at least one plane to the data line and then move the host data corresponding to the read request for the at least one plane from the data buffer to the cache buffer.

12. The storage device of claim 10, wherein, when the memory controller receives the read request for the at least one plane while the valid data is read to the cache buffers respectively corresponding to the plurality of planes, the memory controller controls the memory device to output the valid data corresponding to the at least one plane from the cache buffer corresponding to the at least one plane to the data line and then output the host data corresponding to the read request for the at least one plane to the data line through the data buffer and the cache buffer corresponding to the at least one plane.

13. The storage device of claim 12, wherein the memory controller controls the memory device to output the host data corresponding to the read request for the at least one plane to the data line, before valid data corresponding to other planes except the at least one plane among the plurality of planes are output to the data line.

14. The storage device of claim 10, wherein the memory controller includes:
    a garbage collection controller configured to control the memory device to perform the garbage collection operation on each of the plurality of planes;
    a read operation controller configured to control the memory device to perform the cache read operation of performing reading the host data from the at least one plane by using at least two buffers included in the page buffer corresponding to the at least one plane; and
    a scheduler configured to determine an output sequence of the valid data and the host data, which are output from the page buffers respectively corresponding to the plurality of planes.

15. The storage device of claim 14, wherein the garbage collection controller controls the memory device to temporarily store the valid data from the plurality of planes into the respective page buffers and randomly outputs the temporarily stored valid data to the data line during the garbage collection operation.

16. The storage device of claim 14, wherein the scheduler determines the output sequence such that the valid data corresponding to the at least one plane is output earlier than the valid data corresponding to other planes except the at least one plane among the plurality of planes.

17. The storage device of claim 14, wherein the scheduler determines the output sequence such that the host data from the at least one plane is output earlier than the valid data corresponding to other planes except the at least one plane among the plurality of planes.

18. A storage system comprising:
    a memory device including plural planes respectively corresponding to plural circuits each having a first buffer and a second buffer; and a controller configured to control the memory device to:
perform a garbage collection (GC) operation of moving GC data stored in the planes through the second buffers of the circuits,
read, with the GC data buffered in the second buffers of the circuits, data from a selected one of the planes into the first buffer of the circuit corresponding to the selected plane according to a cache read scheme, and
provide, according to the cache read scheme, the read data from the first buffer to the controller through the second buffer of the corresponding circuit as soon as the GC data is cleared from the second buffer of the corresponding circuit,
wherein the cache read scheme outputs from the first buffer to a data line read data while reading the GC data to the second buffer, and afterwards the GC data stored in the second buffer is moved to the first buffer and then output to the data line.

* * * * *